(12) United States Patent
Tillman

(10) Patent No.: US 9,903,258 B1
(45) Date of Patent: Feb. 27, 2018

(54) ADJUSTABLE COOLANT THERMOSTAT HOUSING

(71) Applicant: James Kevin Tillman, Rogersville, MO (US)

(72) Inventor: James Kevin Tillman, Rogersville, MO (US)

( * ) Notice: Subject to any disclaimer, the term of this patent is extended or adjusted under 35 U.S.C. 154(b) by 387 days.

(21) Appl. No.: 14/602,501

(22) Filed: Jan. 22, 2015

(51) Int. Cl.
F16K 35/06 (2006.01)
G05D 23/19 (2006.01)
G05D 23/02 (2006.01)
F01P 7/16 (2006.01)

(52) U.S. Cl.
CPC .................. F01P 7/167 (2013.01)

(58) Field of Classification Search
CPC .. F01P 7/16; F01P 2007/146; F01P 2007/168; F24D 2220/0257; B60H 1/00485; G05D 23/02; G05D 23/021; G05D 23/022
USPC ........................................................ 236/99 K
See application file for complete search history.

(56) References Cited

U.S. PATENT DOCUMENTS

| | | | |
|---|---|---|---|
| 3,313,483 A * | 4/1967 | Nallinger | F01P 7/16 236/34.5 |
| 4,025,041 A * | 5/1977 | Tyler | F23N 5/025 236/90 |
| 4,431,133 A * | 2/1984 | Roberson, Sr. | F01P 7/16 137/522 |
| 4,550,693 A * | 11/1985 | Saur | F01P 7/167 123/41.1 |
| 4,570,848 A * | 2/1986 | McLellan | G05D 23/1346 137/625.4 |
| 4,961,530 A | 10/1990 | Shaw | |
| 5,385,296 A | 1/1995 | Wilhelm | |
| 5,931,375 A * | 8/1999 | Gylov | G05D 23/022 137/505.38 |
| 6,471,133 B1 * | 10/2002 | O'Flynn et al. | F01P 7/16 123/41.1 |
| 6,598,565 B2 * | 7/2003 | Fishman | F01P 7/167 123/41.1 |
| 6,742,716 B1 * | 6/2004 | Duprez | F01P 7/167 236/34.5 |
| 6,764,020 B1 * | 7/2004 | Zhao | G05D 23/022 123/41.1 |
| 6,820,817 B2 | 11/2004 | Leu | |
| 7,987,822 B2 * | 8/2011 | Fishman | F01P 7/167 123/41.1 |
| 2003/0150923 A1* | 8/2003 | Leu | F01P 7/167 236/34.5 |
| 2015/0260410 A1* | 9/2015 | Besati | F23K 5/007 99/331 |

* cited by examiner

Primary Examiner — Grant Moubry
Assistant Examiner — Miguel A Diaz

(57) ABSTRACT

An adjustable coolant thermostat housing has a threaded adjustment shaft (15) that when turned moves it's mating surface with the wax body rod (14) farther from or closer to the thermostat wax body (8) which determines at what temperature the thermostat valve (10) opens or closes. This embodiment allows an individual to adjust what the operating temperature of the engine coolant is ultimately set to. Instead of a preset, nonadjustable thermostat, my embodiment allows a range of coolant temperatures to be chosen. The coolant temperature could also be remotely adjusted using one of the other embodiments.

6 Claims, 6 Drawing Sheets

ADJUSTABLE COOLANT THERMOSTAT HOUSING

CROSS-REFERENCE TO RELATED APPLICATIONS

This application claims the benefit of PPA 61/966,010. Filed on Feb. 14, 2014 by the present inventor.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING

Not Applicable

COMPACT DISK APPENDIX

Not Applicable

BACKGROUND

The present embodiment is in the technical field of liquid cooled engines. More particularly, the present embodiment is in the technical field of engine cooling systems. More particularly, the present embodiment is in the technical field of thermostatic temperature controlling of engine cooling systems.

Prior Art

Conventional thermostats control the flow of coolant which is forced through the engine, through the radiator by the water pump. The conventional design is using a preset temperature controlled thermostat that controls the coolant flow with a valve. A wax in the thermostat that expands with an increase in temperature is used to provide the controlling force. The typical thermostat is not adjustable, set to a fixed temperature, and therefore must be physically replaced with one of a different value to change the coolant temperature.

Previously to correct this problem, but rarely used because of the considerable expense and complexity, thermostat valves have been provided with heating elements to influence the expandable wax body. An electronic thermostat valve is similar to a typical thermostat assembly except it has a heater. A problem arises that if the heater is too robust the thermostat wax body can be damaged. Another drawback is problems with running the wiring and electric connections in by the coolant which could short out the wiring. Another approach taken in the past is by physically altering the wax body size and applying pressure directly to the wax body changing its temperature characteristics. My design does not influence the thermostat wax body directly but merely alters the housing in which the thermostat interacts. By changing the wax body rod's interface with the housing the temperature can be altered, By making the thermostat assembly control too overly complex adds more elements which can fail and cause catastrophic engine damage. Staying with a relatively simple way of making the thermostat adjustable is the most prudent path to success.

SUMMARY IN ACCORDANCE WITH ONE EMBODIMENT

The present embodiment is an adjustable coolant thermostat housing. The temperature at which the valve opens can be influenced by the adjustment shaft. The adjustment shaft sets the reference depth and therefore the temperature at which the valve opens. The valve controls coolant flow through the engine and through the cooling system. The valve opening can be set to different temperatures with an adjustment screw shaft. The embodiment could be used on any cooling system that uses thermostatic cooling control. The adjustable coolant thermostat housing could be altered for use on any vehicle and manufactured to meet up with the engine cooling system since the thermostat assembly isn't altered just the housing in which it sits.

DETAILED DESCRIPTION—FIRST EMBODIMENT

Referring now to my embodiment in more detail, in FIG. 2a there is shown a modified thermostat housing 5. This thermostat housing 5 began as an unmodified 99 corvette LS1 thermostat housing FIG. 1. Any assembly of this type or of similar construction could be modified and made adjustable in this manner. This particular housing assembly 5 is made of aluminum. The thermostat housing pedestal 4 which is cylindrical, approximately 1 inch tall and extends perpendicular from the wall of the thermostat housing 5 and is centered upon the wax body rod 14 of the thermostat. The thermostat housing 5 mounts to the engine at the mounting tabs 7 and 13. The housing to engine seal 23 creates the necessary seal for the engine coolant. The thermostat housing tab 22 and thermostat housing tab 23 support the thermostat in the housing. The coolant hose connects onto this coolant hose connection 16. Coolants flows through this thermostat housing 5 and the flow is controlled by the round thermostat valve 10. The thermostat wax body 8 is influenced by temperature and expands on an increase in temperature therefore pushing the wax body rod 14 outward. Its opening temperature is controlled when the pressure from thermostat spring 11 on the thermostat valve 10 is overcome by pressure exerted against the wax body rod 14 by the expanding thermostat wax body 8 pressing against a reference point. It is fixed in its original configuration FIGS. 1a and 1b, but modified here in FIG. 2a and FIG. 2b to be an adjustable distance from the thermostat wax body 8. In this modified form wax body rod 14 sits against the end of the threaded adjustment shaft 15.

In further detail, still referring to the embodiment of FIG. 2a: The manual adjustment of the temperature is made by turning the adjustment shaft knob 1 which turns the threaded adjustment shaft 15, which contacts the wax body rod 14. By moving the wax body rod 14 reference point in or out in relation to its normally fixed position will adjust when the temperature that the thermostat valve 10 opens. Once the coolant has got hot enough that the thermostat wax body 8 pushes the wax body rod 14 out enough, against the thermostat spring 11, that the thermostat valve 10 will leave its thermostat valve seat 9 and let coolant flow freely. Once the coolant has cooled enough the thermostat valve 10 will close or get closer to the thermostat valve seat 9 reaching equilibrium.

My embodiment is that of moving the reference point of the wax body rod 14 closer or farther away will thereby effect the operating temperature of the coolant control thermostat valve 10. Moving the wax body rod 14 farther away will raise the temperature that it takes to lift the thermostat valve 10. This occurs because the thermostat wax body 8 must expand more to lift the thermostat valve 10 off its thermostat valve seat 9 which equals to an increase in temperature before opening. The use of the adjustment shaft knob 1 is used to provide a better leverage upon the threaded adjustment shaft 15. The use of the locking nut 2 holds the threaded adjustment shaft 15 by tension and friction in place so it will not move and therefore change the running temperature. The tapered spacer 3 is used to keep the locking nut 2 from interfering with the thermostat housing 5.

An alternate design can be used in which a locking nut 2 interferes with the housing and locks the threaded adjustment shaft 15 and the tapered spacer 3 is not needed. The thermostat housing pedestal 4 which is cylindrical, approximately 1 inch tall and extends perpendicular from the wall of the thermostat housing 5. The thermostat housing pedestal 4 which originally was used to position the wax body rod 14 is drilled out and threads are tapped into its length. An O-ring seal seat 21 is machined into the end of the thermostat housing pedestal 4 for the O-ring seal 12 to sit. This is a high temperature O-ring seal 12 to take the relatively hot temperatures. Then the cap 6 is then pressed onto the thermostat housing pedestal 4 to retain the O-ring seal 12 and to create the needed pressure on the O-ring seal 12 to provide a good seal. The cap 6 is drilled to provide a path for the wax body rod 14 to go into and through the cap 6 and O-ring seal 12. The wax body rod 14 goes into the drilled thermostat housing pedestal 4 and rests against the threaded adjustment shaft 15. The threaded adjustment shaft 15 is used to provide a change in position of the wax body rod 14. The threaded adjustment shaft 15 provides a base for the wax body rod 14 to rest against.

By adjusting how much the thermostat wax body 8 must expand will determine when the wax body rod 14 will exert enough pressure to lift the thermostat valve 10 off its thermostat valve seat 9 and let the coolant flow through. This reference point ultimately determines the operating temperature of the engine and coolant.

The threads are set to a depth that will provide a stopping point for the wax body rod 14 to come into contact with. The threads are too narrow for the wax body rod 14 to pass through and this creates the wax body rod limiter 20. This will set a maximum temperature point and keep the user from overheating the engine by adjusting the wax body rod 14 past a safe operating range. In this instance the operating temperature is adjustable to approximately 145 to 180 degrees Fahrenheit by using a 160 degree thermostat wax body 8. The overall temperature could be altered by using different wax bodies that have different temperature characteristics.

In further detail, still referring to the embodiment of FIG. 2a and FIG. 2b: The threaded adjustment shaft 15 is a 10-24 typical threaded shaft. The adjustment shaft knob 1 can be phenolic plastic with a brass insert threaded component to mate to the threaded adjustment shaft 15 or a brass adjustment shaft knob 1 can be used along with a brass locking nut 2 to lock the setting. The O-ring seal 12 is of an appropriate size to fit tightly around the wax body rod 14 and provide a seal against coolant leakage. The hole drilled in the thermostat housing pedestal 4 is of the appropriate size to take threads for a 10-24 typical threaded shaft.

In further detail, still referring to my embodiment of FIG. 2a and FIG. 2b: The thermostat housing 5 is made of aluminum but any material that can take the heat could be used. The threaded adjustment shaft 15 is made of steel in this case but could be any material that is hard enough to be threaded, of a usable diameter, thread pitch and take the heat without deforming. The adjustment shaft knob 1 is phenolic plastic or brass but could be any material that is hard enough to be threaded, attached to the shaft and take the heat without deforming. The O-ring seal 12 is of a high temperature material to take the high heat. The cap 6 is steel in this case but any material could be used that would sufficiently hold the O-ring seal 12 in place and create a leak proof seal without deforming from the pressure and temperature.

DETAILED DESCRIPTION—ALTERNATIVE EMBODIMENTS

The present embodiment could be improved upon by making the adjustment assembly modular as seen in FIG. 2c. This assembly could be pressed into the thermostat housing pedestal 4 as a complete unit. This would save time and keep errors down. This would greatly increase the speed at which the total assembly could be manufactured and could decrease defects. The thermostat housing pedestal 4 would be drilled out or the thermostat housing 5 remanufactured with space for the adjustment module 18 as shown in FIG. 2c.

The present embodiment could be compounded upon by adding a worm screw gear drive at 90 degrees to the threaded adjustment shaft 15. This design would allow for more clearance and still have adjustment of the threaded adjustment shaft 15.

Also the present embodiment could be compounded upon by using a small electric motor to turn the threaded adjustment shaft 15. This electric motor would be driven off of an electric source and use a switch to control current to the motor. Voltage polarity would dictate turning direction of the threaded adjustment shaft 15 and therefore temperature control of the thermostat.

Also the present embodiment could be compounded upon by using a mechanical remote control with a shaft and cable connected to the threaded adjustment shaft 15. By using the stiff but flexible material inside a casing it would allow remote turning of the screw adjustment shaft 15.

The present embodiment could be compounded upon by using an intelligent device that could be preset to a temperature. The controller device would then turn the threaded adjustment shaft 15 remotely. In this embodiment the device would provide a positive or negative electric voltage source. This voltage would then control the electric motor which would turn the threaded adjustment shaft.

Advantages:

The advantages of the present embodiment include, without limitation, the ability to regulate the temperature of the engine coolant to a wider temperature range than was previously just a preset temperature. By making it adjustable it could be used on engine dynamometers to establish power and drivability at these different temperatures. The temperature could be lowered to see how much performance gain is made. Every 10 degrees of intake air temperature reduction equals 1% more power. Example with 500 horsepower a 30 degree drop in air intake temperature equals a 15 horsepower gain. The engine temperature greatly affects this air intake temperature from the air intake tract being so long. It absorbs this heat from the air intake materials. The temperature could be lowered to see if a decrease in cylinder detonation can be determined. The temperature could be raised to see when detonation begins to occur. The temperature could be raised to see when the engine computer goes closed loop to maximize fuel mileage. It is not unusual for automotive enthusiasts to change out the lower temperature thermostat that they installed in the spring for a higher temperature thermostat for winter driving. It also by being user adjustable would allow one to set the coolant temperature higher in the winter time to have better heating in the cabin, since most automobiles use engine coolant and a heat exchanger for cabin heating. With the hotter coolant temperature setting the increased warmth could be used to heat the cabin more effectively. When hotter summer temperatures arrive the thermostat could be set to a colder coolant setting to keep detonation thresholds lower and/or to improve power. The overall cooling capacity ultimately determines the operating temperature, but if sufficient then it can be controlled with this embodiment. The improved housing which is easy to change since only two bolts hold it on would be well received in the aftermarket automotive enthusiast environment where there is a great need for such a product.

While the foregoing written description of the embodiment enables one of ordinary skill to make and use what is considered presently to be the best mode thereof, those of ordinary skill will understand and appreciate the existence of variations, combinations, and equivalents of the specific embodiment, method, and examples herein. Thus the reader will see that at least one embodiment provides an improvement on the ability to choose the temperature of the coolant rather than a preset nonadjustable temperature. While my above description contains many specificities, these should not be construed as limitations on the scope, but rather as an exemplification of several embodiments.

Accordingly the scope should be determined not by the embodiment illustrated, but by the appended claims and the legal equivalents.

DRAWINGS—REFERENCE NUMERALS

Figure 1A:
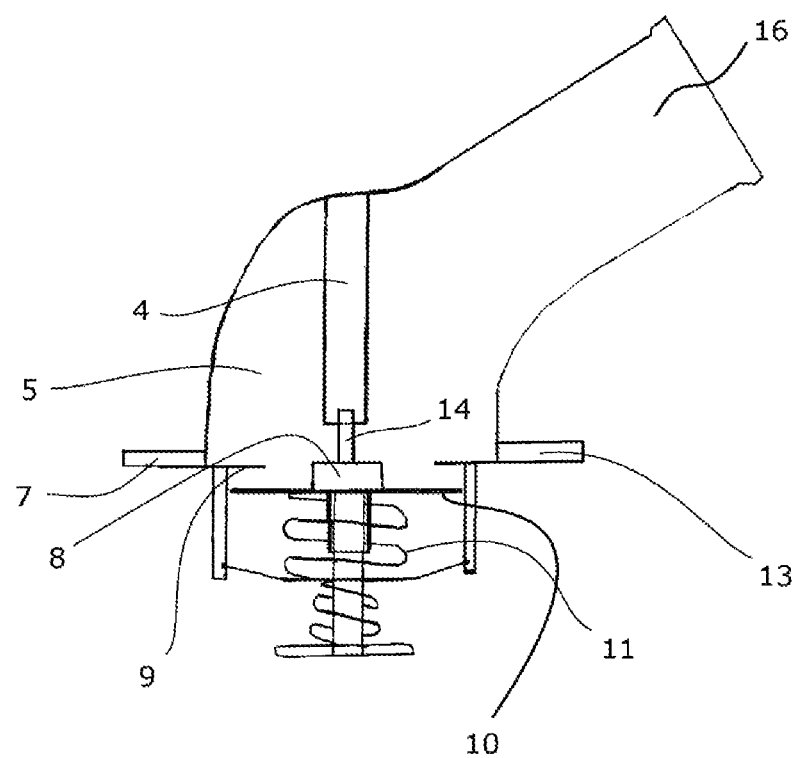
FIG. 1a is the side view of prior original unimproved thermostat and thermostat housing assembly.
Figure 1B:
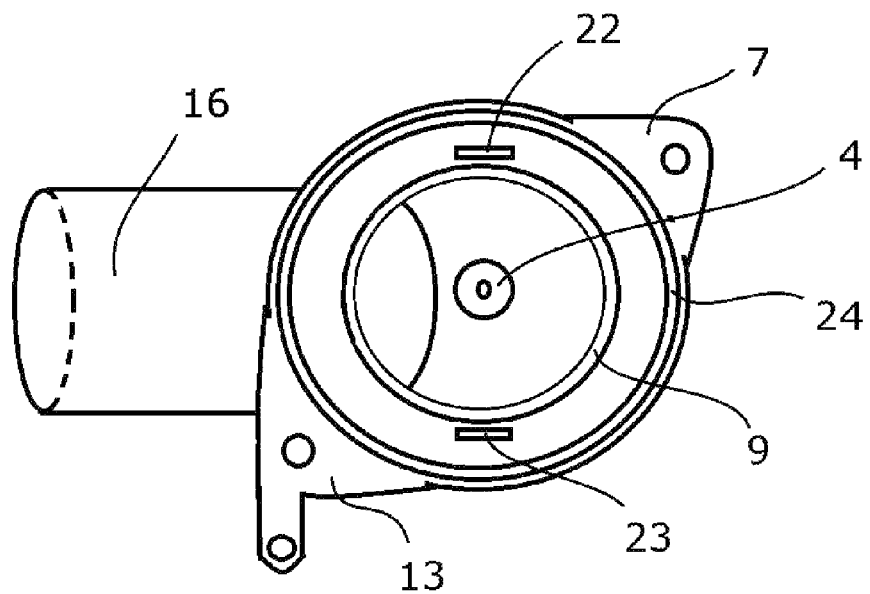
FIG. 1b is the bottom view of prior thermostat housing assembly.
Figure 2A:
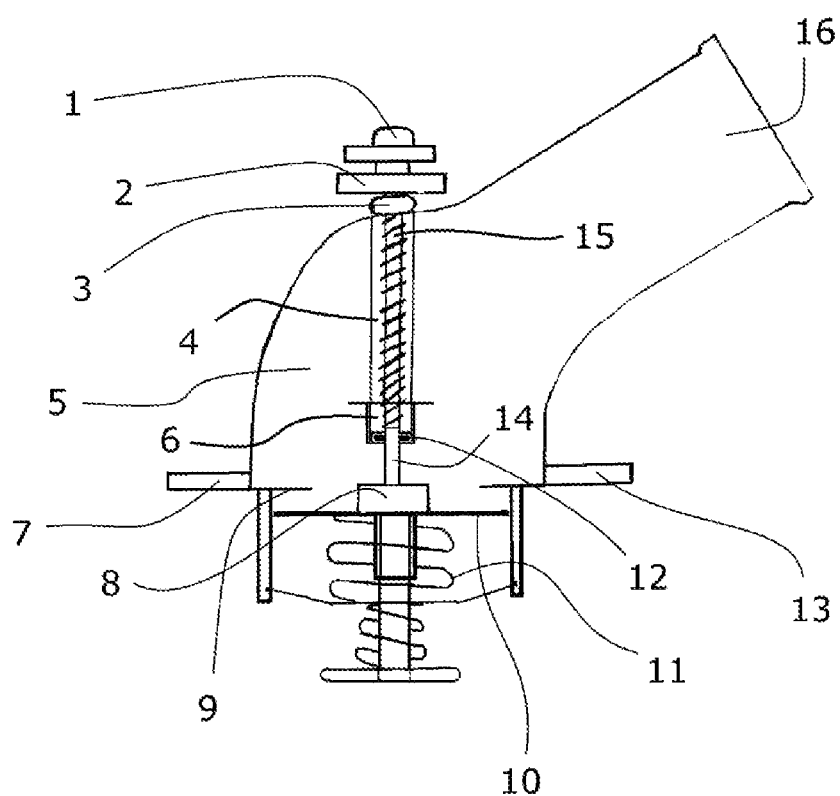
FIG. 2a is the side view of the present embodiment and the thermostat valve is in the open position adjusted to a colder temperature setting.
Figure 2B:
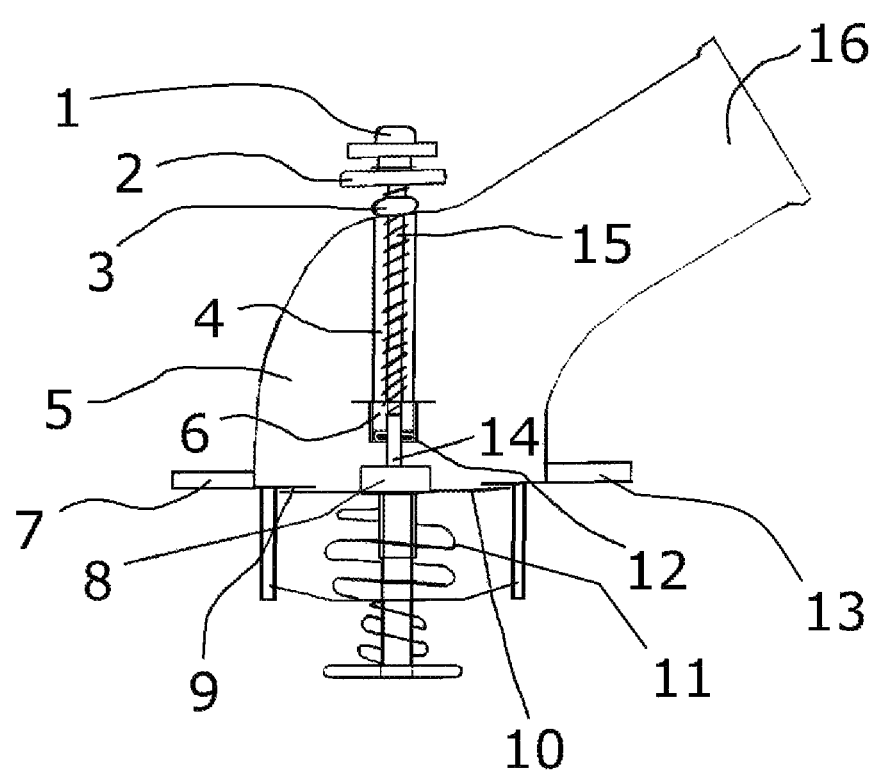
FIG. 2b is the side view of the present embodiment and the thermostat valve is in the closed position adjusted to a warmer temperature setting.
Figure 2C:
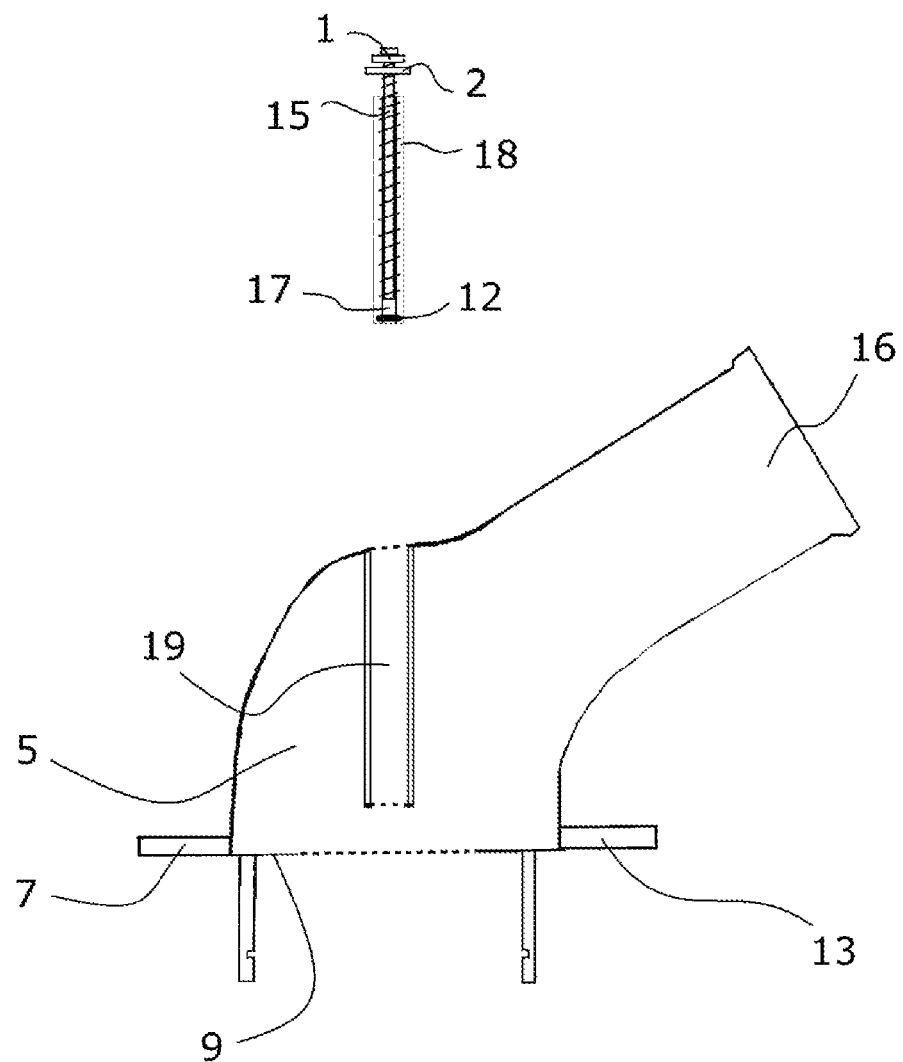
FIG. 2c is the side view of the present embodiment adjustment module that is inserted into the machined thermostat housing.
Figure 2D:
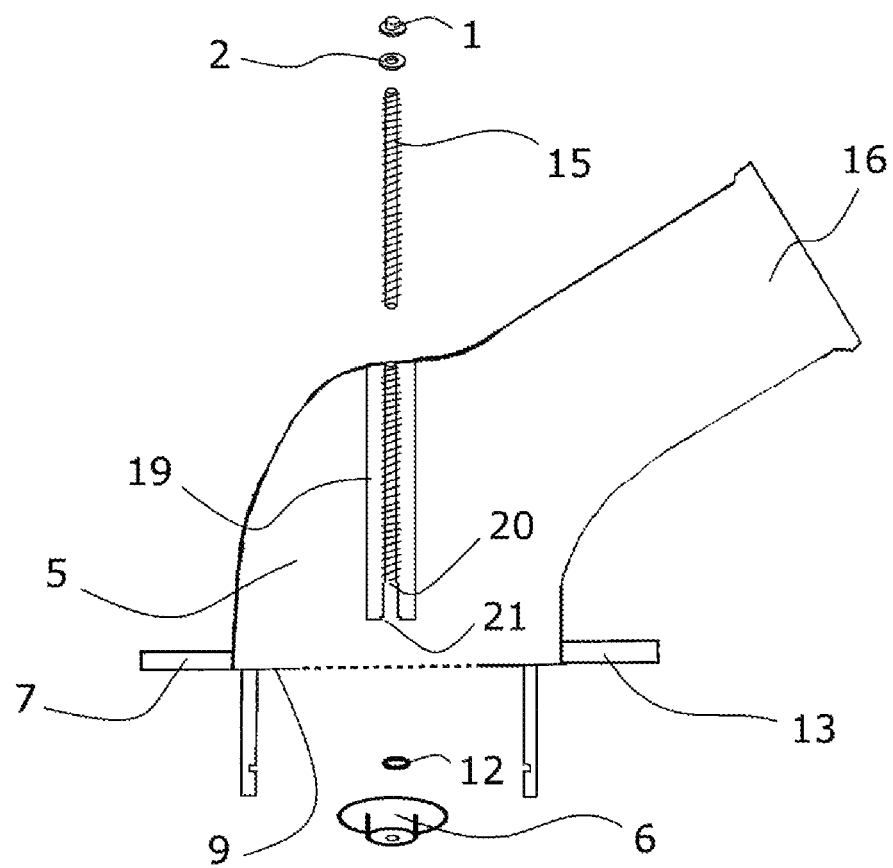
FIG. 2d is the side view of the present embodiment disassembled.

1. Adjustment shaft knob
2. Locking nut
3. Tapered spacer
4. Thermostat housing pedestal
5. Thermostat housing
6. Cap
7. Mounting tab
8. Wax body
9. Thermostat valve seat
10. Thermostat valve
11. Thermostat spring
12. O-ring seal
13. Mounting tab
14. Wax body rod
15. Threaded adjustment shaft
16. Coolant hose connection
17. Empty space to accommodate wax body rod
18. Adjustment module
19. Machined space in thermostat housing pedestal for adjustment module
20. Wax body rod limiter
21. O-ring seal seat
22. Thermostat housing tab
23. Thermostat housing tab
24. Housing to engine seal

I claim:

1. An adjustable coolant thermostat for an automobile engine which allows an automotive coolant temperature to be adjusted up or down as desired, the adjustable coolant thermostat comprising:

a thermostat housing including at least one mounting element to be mounted on the automobile engine, a coolant hose connection, and a cylindrical thermostat housing pedestal that defines a space which houses a thermostat wax body rod of a round thermostat valve and a threaded adjustment shaft, wherein the cylindrical thermostat housing pedestal, the thermostat wax body rod and the threaded adjustment shaft are assembled so as to be concentric with each other;

wherein the thermostat wax body rod is arranged to abut a lower end of the threaded shaft inside of the cylindrical thermostat housing pedestal to actuate the round thermostat valve by lifting the valve from a valve seat of the thermostat housing;

wherein the threaded adjustment shaft includes an adjustment shaft knob located at a distal upper end of the threaded adjustment shaft exterior to the thermostat housing to turn the threaded adjustment shaft and thereby control the displacement of the thermostat wax body rod within the cylindrical thermostat housing pedestal to provide coolant temperature adjustment; and a cap pressed onto a lower end of the thermostat housing pedestal and that retains a sealing element therebetween, wherein the cap and sealing element provide a passage that maintains a position of the thermostat wax body rod in the thermostat housing pedestal so as to allow for abutment of the thermostat wax body rod with the threaded shaft therein.

2. The adjustable coolant thermostat for an automobile engine of claim 1 further comprising:

a wax body rod limiter within the housing pedestal including a threaded bore wherein the threaded shaft is inserted by screwing said shaft into said bore, and a wax body rod limiting bore having a larger diameter than the threaded bore to limit a maximum displacement of the thermostat wax body rod within the thermostat housing pedestal, thus limiting the maximum coolant temperature to prevent exceeding a predetermined safe temperature level.

3. The adjustable coolant thermostat for an automobile engine of claim 1, wherein the threaded adjustment shaft further comprises:

a locking nut adjacent the adjustment shaft knob at a lower portion thereof, and a tapered spacer adjacent to a lower portion of the adjustment shaft knob to prevent the locking nut from interfering with the thermostat housing.

4. The adjustable coolant thermostat for an automobile engine of claim 1, wherein the sealing element is an O-ring type seal.

5. The adjustable coolant thermostat for an automobile engine of claim 1, wherein the cap is made of steel and is sized so as to provide a tight friction attachment to stay positioned on the lower end of the thermostat housing pedestal.

6. The adjustable coolant thermostat of claim 1, wherein the thermostat housing is made of aluminum and the thermostat housing pedestal is formed by at least one of machining and molding to provide the space which houses the thermostat wax body rod and the threaded adjustment shaft.

* * * * *